Jan. 4, 1938.                F. R. ERBACH                2,104,074
               AUTOMATIC CLUTCH FOR MULTIPLE V-BELT DRIVES
                        Filed June 26, 1935
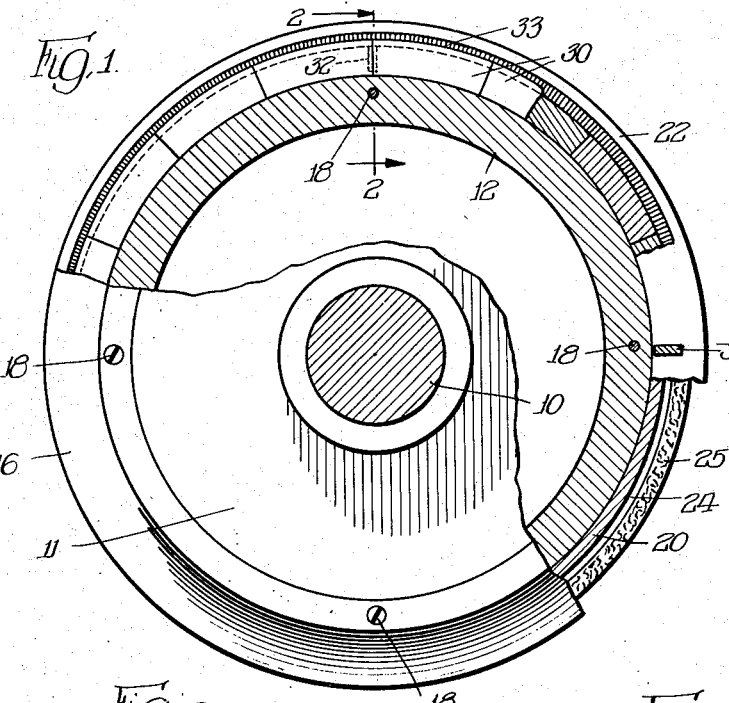
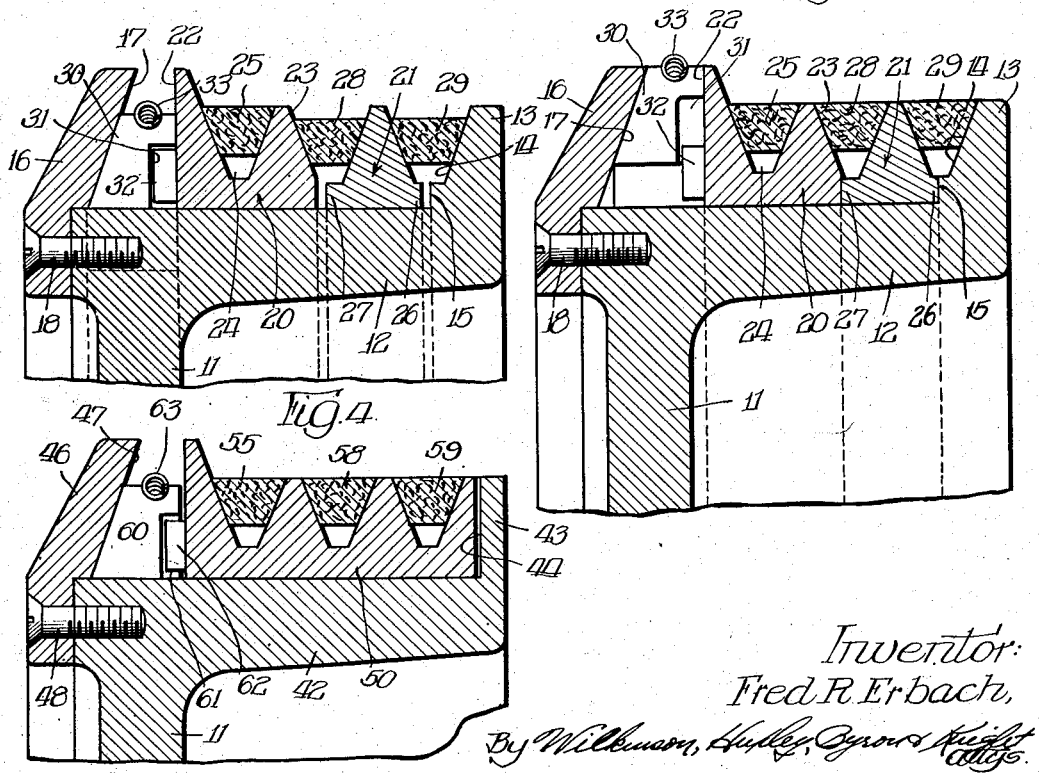
Inventor:
Fred R. Erbach,
By Wilkinson, Huxley, Byron & Knight
attys.

Patented Jan. 4, 1938

2,104,074

UNITED STATES PATENT OFFICE 2,104,074

AUTOMATIC CLUTCH FOR MULTIPLE V-BELT DRIVES

Fred R. Erbach, Beloit, Wis., assignor to General Refrigeration Corporation, Beloit, Wis., a corporation of Delaware Application June 26, 1935, Serial No. 28,399

8 Claims. (Cl. 74—219)

The invention relates to clutches and particularly to centrifugal clutches for establishing driving relation between a source of power and a driven element.

The invention has for a primary object to provide a centrifugal clutch of simplified construction having a minimum of parts that will not readily get out of order and which will operate efficiently over a long period of time.

Automatic clutches as previously designed have generally been incorporated in the driving member which in the case of a standard motor drive is a small pulley, whereas, the driving element comprises a large diameter pulley. In the illustrated embodiment of the invention the clutch parts are carried by a relatively large fly wheel forming the driven member, which by reason of its size provides greater space, permitting the use of large elements to thereby greatly increase the action of the centrifugal force on the same.

A further object is to provide a centrifugal clutch in which all the elements are carried on the rim of a fly wheel, thereby permitting the complete removal of the fly wheel from its shaft without disengaging the clutch assembly. The invention contemplates a clutch comprising a plurality of annular sections carried on the periphery of the fly wheel and which have association with endless belts operatively connecting the sections with a source of power such as an electric motor. The number of belts can be increased by merely changing the number of sections or by changing the number of grooves in a section to accommodate more belts. In operation of the present clutch the driving forces from the belts are carried from one belt to another and therefore uniform belt tension results.

With these and other objects in view, the invention may consist of certain novel features of construction and operation as will be more fully described and particularly pointed out in the specification, drawing and claims appended hereto.

In the drawing which illustrates an embodiment of the device and wherein like reference characters are used to designate like parts—

Figure 1 is an elevational view of a fly wheel equipped with the improved clutch of the invention and having parts broken away in order to show details of the clutch structure;

Figure 2 is a transverse sectional view of the rim of the fly wheel taken substantially along line 2—2 of Figure 1;

Figure 3 is a sectional view similar to Figure 2 but showing the clutch parts in operative position; and Figure 4 is a transverse sectional view through the rim of the fly wheel showing the same equipped with a modified form of clutch.

Referring to Figure 1 of the drawing, the shaft 10 comprises the driven shaft of the apparatus and may have connection with a compressor or any other equipment which is to be driven from a source of power such as an electric motor. Fixed to shaft 10 is a fly wheel 11 having a peripheral flange thereon providing the rim 12. In accordance with the invention the rim is formed along one edge with an upstanding portion 13 which may take the form as shown in Figure 2, having a diagonal wall 14 extending from right to left, and a shoulder 15 at the base thereof where the portion has its greatest thickness. To complete the rim there is detachably secured to the opposite edge an annular ring 16 forming an upstanding portion in opposition to portion 13 and which is provided with a wall 17 also extending diagonally, being substantially parallel with wall 14. The base of the ring is provided with openings at intervals around its inner circumference for receiving the securing screws 18 having threaded engagement with the rim 12 to releasably secure the ring in place.

The periphery of the fly wheel has a close but sliding fit with annular sections 20 and 21, which are therefore carried by the rim in a manner permitting relative movement of the sections and fly wheel. Section 20 has one edge formed to provide a vertical wall 22 which in conjunction with wall 17 of the ring forms a space of trapezoidal shape in cross section. The wall 23 on the opposite side of the section is diagonal, extending in a direction from left to right, while intermediate said walls the section is provided with a V-shaped flat base groove 24 for receiving the belt 25 of similar shape. The section 21 tapers from a narrow width at the top to a maximum width adjacent shoulder portions 26 and 27, the tapering walls thereof providing in conjunction with walls 23 and 14 grooves for receiving the belts 28 and 29. It will be observed that the grooves formed by the tapering walls of section 21 in conjunction with wall 23 of the section 20 and wall 14 of portion 13 are similar in shape to groove 24 and receive belts having substantially the same shape in cross section as belt 25.

When the sections above described are positioned as shown in Figure 2 the grooves receiving the belts 28 and 29 are considerably wider than the standard groove 24 and therefore these belts assume a position below the top of the groove. In this position there is slack in the belts 28 and 29 and it is noted that clearance space exists between shoulders 15 and 26 and between shoulder 27 and the base of section 20.

The present clutch is designed for automatic operation which is dependent upon the section 20 attaining the proper speed. Located within the trapezoidal space between ring 16 and the vertical wall of section 20 are a plurality of arcuate segments 30 also of trapezoidal shape having an angular wall engaging with wall 17 and a vertical wall contacting wall 22. As will be evident from an inspection of Figure 1, sixteen segments are employed extending completely around the periphery of the rim 12. Certain contacting segments are provided with a recess 31 in the adjacent walls thereof for receiving the lug or key 32 projecting outwardly from the vertical wall of section 20. A coil spring 33 extends completely around the circumference of the segment and lies within a semi-circular groove formed in the segments, respectively. This coil spring maintains a tension on the segments, holding them in contact with the rim 12 and positioned within the space between ring 16 and section 20 as shown in Figure 2. This is the position of the segments and sections when the fly wheel is at rest and therefore the section 20 has attained sufficient speed to cause the segments 30 to travel outwardly against the tension of the coil spring 33. It will be observed that section 20 provides a standard groove 24 which receives the belt 25 to result in immediate rotation of said section on the rim 12 of the fly wheel upon starting the electric motor or other source of power for driving the fly wheel through the clutch of the invention. As the segments are keyed to the section 20 they are also rotated. Eventually the electric motor or source of power driving section 20 will rotate the section at a speed sufficient to cause outward movement of the segments 30 against the tension of the coil spring 33. This outward movement will take place when the centrifugal force acting on the segments overcomes the tension of the spring 33, holding the segments in contact with the rim of the fly wheel. Any outward movement of the segments will result in moving the sections laterally toward the right as the segments have contact with the diagonal wall 17 of the ring. The clearance between the sections is gradually taken up as the segments travel outwardly and likewise the clearance existing between the base of section 21 and the base of portion 13 is reduced until section 21 is brought into contact with shoulder 15, whereupon section 20 will be in contact with section 21. As this lateral movement of the sections is taking place the grooves receiving belts 28 and 29 are being gradually reduced in width, forcing the belts to assume a position flush with the top of the groove as shown in Figure 3. The slack in the belts is accordingly taken up and the belts now begin to transmit power to the fly wheel to cause rotation of the same, as the reaction of the forces on the angular faces of the belts produce the necessary traction to drive belt 29 against the portion 13 of the fly wheel without slippage and to drive the belt 28 against the angular face of section 20 without slippage. When the segments 30 reach their maximum outward position as shown in Figure 3 all of the elements of the clutch are in solid contact with the side walls provided by the rim and therefore the elements and the fly wheel rotate as a unit, the drive from the belts being transmitted to the fly wheel to cause rotation of shaft 10.

In the modification shown in Figure 4 the fly wheel is provided with a rim 42 having an upstanding portion 43 provided with a vertical wall 44. A ring 46 is detachably secured by screws 48 with the rim of the fly wheel and which provides an angular wall 47 with which the segments 60 engage. This form of clutch employs a single section 50 having three standard grooves formed therein for receiving the belts 55, 58, and 59. As in the form of clutch shown in Figure 2 the section 50 has a close but sliding fit on the periphery of the rim 42 so that relative movement between the parts may take place.

The operation of this form of clutch is similar to that of the clutch previously described. The segments 60 are keyed to section 50 by means of the projecting keys 62 and recesses 61 formed in the adjacent walls of certain contacting segments. When the motor or other source of power is started up to drive the belts 55, 58, and 59 the section 50 will freely rotate on the rim of the fly wheel. As the speed of the section and segments increases the segments will gradually travel outwardly against the tension of the coil spring 63 to result in a lateral shifting of segment 50 on the rim in a direction to the right. When section 50 attains the proper speed the segments will assume their maximum outward position which will bring the section 50 up solid against wall 44 of portion 43 of the rim. The parts of the clutch and fly wheel thus move as a unit and the drive from the belts is transmitted through section 50 to the fly wheel and to shaft 10.

In the embodiments of the invention disclosed in the drawing the fly wheel may be described as having spaced portions on its periphery providing a channel which carries at least one section having a standard size groove. The endless belt fitting in the groove in this section connects with a source of power which rotates said section immediately upon the starting up of said source of power. This, however, does not drive the fly wheel as the section and fly wheel normally have relative movement. The automatic operation of the clutch can be attributed to the weighted segments which are rotated by the section and therefore travel outwardly against the tension of the coil spring when the section attains a definite speed. This outward movement of the segments caused by centrifugal force acting on the same results in a lateral shifting of the section on the periphery of the fly wheel until the elements of the clutch are in solid contact with each other and with the spaced portions, whereupon the rotary movement of the section is transmitted to the fly wheel.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a centrifugal clutch, a member journalled for rotation by a shaft having the member fixed thereto, an annular section encircling said member and having a sliding fit on the periphery thereof, whereby relative movement between the member and section is possible, said section being provided with a groove extending completely around the section, an endless belt fitting within the groove and having operative connection with a source of power for rotating the section, and instrumentalities having rotation with said section and operative when said section attains a definite speed to cause rotary movement of said section to be transmitted to the member.

2. In a centrifugal clutch, a member journalled for rotation by a shaft having the member fixed thereto, an annular section encircling said member and having a sliding fit on the periphery thereof, whereby relative movement between the member and section is possible, said section having operative connection by means of an endless belt with a source of power, a second annular section carried by the member and having relative movement on its periphery, an endless belt positioned between the sections and having connection with said source of power, and instrumentalities having rotation with said first mentioned section and operative when said section attains a definite speed to cause the power from said belts to be transmitted through the sections to the member.

3. In a centrifugal clutch, a member journalled for rotation by a shaft having the member fixed thereto, an annular section encircling said member and having a sliding fit on the periphery thereof, whereby relative movement between the member and section is possible, said section having operative connection by means of an endless belt with a source of power, a second annular section carried by the member and having relative movement on its periphery, an endless belt positioned between the sections and having connection with said source of power, and segments extending around the periphery of said member and having rotation with said first mentioned section, said segments being operative when said section attains a definite speed to cause the drive from the belts to be transmitted through the sections to the member.

4. In a centrifugal clutch, a driven shaft having a fly wheel for rotation therewith, a plurality of annular sections having a sliding fit on the periphery of said fly wheel whereby relative movement between the sections and fly wheel is possible, one of said sections having connection with an endless belt for rotating the section from a source of power, a belt fitting between the sections and between the other section and said fly wheel respectively, and instrumentalities having rotation with said first mentioned section and operative when said section attains a definite speed to hold said sections to the fly wheel whereby said belts transmit their power through the sections to cause rotation of the fly wheel.

5. A centrifugal clutch, including a fly wheel journaled for rotation, portions extending from the periphery of said fly wheel on the respective sides thereof, an annular section having a sliding fit on the periphery of the fly wheel between the portions, said section being provided with a groove receiving an endless belt for rotating the section from a source of power, segments extending around the periphery of said fly wheel and located between said section and one of said portions, said segments being rotated by said section, and resilient means holding the segments in contact with the periphery of said fly wheel, said segments travelling outwardly against the tension of said resilient means when said section attains a definite speed and being operative to cause the rotary movement of said section to be transmitted to the fly wheel.

6. A centrifugal clutch including a fly wheel journalled for rotation, portions extending from the periphery of said fly wheel on the respective sides thereof, an annular section having a sliding fit on the periphery of said fly wheel between the portions, said section being provided with a groove receiving an endless belt for rotating the section from a source of power, segments extending around the periphery of said fly wheel and located between said section and one of said portions, said segments being rotated by said section and having a sloping wall engaging a complementary sloping wall provided by said portion to cause lateral movement of the segments and section on the periphery of the fly wheel when said segments move outwardly, and resilient means encircling the segments and yieldingly holding the same in contact with the periphery of said fly wheel.

7. A centrifugal clutch including a fly wheel journalled for rotation, portions extending from the periphery of said fly wheel on the respective sides thereof, an annular section having a sliding fit on the periphery of said fly wheel between the portions, said section being provided with a groove receiving an endless belt for rotating the section from a source of power, a second annular section having a slidable fit on the periphery of said fly wheel, an endless belt fitting between the sections and between said second section and one of said portions respectively, segments extending around the periphery of the fly wheel and located between said first mentioned section and said other portion, said segments being rotated by said first mentioned section and having a sloping wall engaging a complementary sloping wall formed on said other portion, and resilient means encircling the segments for yieldingly holding the same in contact with the periphery of said fly wheel.

8. A centrifugal clutch including a fly wheel journalled for rotation and having spaced portions extending around its periphery providing a channel, a pair of annular sections having a sliding fit on the periphery of the fly wheel and located between said portions, one of said sections being provided with a groove receiving an endless belt having connection with a source of power for rotating the section, other endless belts fitting between the sections and between the other section and one of said portions, and instrumentalities located between the section rotated by the source of power and said other portion, said instrumentalities being normally held in contact with the periphery of the fly wheel but being caused to travel outwardly by centrifugal force when said section attains a definite speed to cause the drive from the belts to be transmitted through the sections to the fly wheel.

FRED R. ERBACH.